United States Patent
Bai et al.

(10) Patent No.: US 12,349,169 B2
(45) Date of Patent: Jul. 1, 2025

(54) USER EQUIPMENT CAPABILITY-BASED TRANSMISSION CONFIGURATION INDICATOR STATE CONFIGURATION

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 17/809,689

(22) Filed: Jun. 29, 2022

(65) Prior Publication Data

US 2023/0039152 A1 Feb. 9, 2023

Related U.S. Application Data

(60) Provisional application No. 63/260,037, filed on Aug. 6, 2021.

(51) Int. Cl.
*H04W 72/51* (2023.01)
*H04W 72/044* (2023.01)
*H04W 72/0453* (2023.01)

(52) U.S. Cl.
CPC ....... *H04W 72/51* (2023.01); *H04W 72/0453* (2013.01); *H04W 72/046* (2013.01)

(58) Field of Classification Search
CPC .......... H04W 72/51; H04W 72/0453; H04W 72/046
USPC ........................................ 370/329
See application file for complete search history.

(56) References Cited

U.S. PATENT DOCUMENTS

| | | | | |
|---|---|---|---|---|
| 11,553,375 | B2 * | 1/2023 | Huang | H04W 72/231 |
| 2022/0022180 | A1 * | 1/2022 | Rahman | H04L 5/0023 |
| 2022/0394548 | A1 * | 12/2022 | Huang | H04W 72/51 |
| 2024/0064725 | A1 * | 2/2024 | Zhang | H04W 72/232 |
| 2024/0396614 | A1 * | 11/2024 | Zhang | H04L 5/005 |

OTHER PUBLICATIONS

Spreadtrum Communications, Enhancements on Multi-beam Operation, 3GPP TSG RAN WG1 #105-e, R1-2104411, May 10, 2021 (Year: 2021).*
International Search Report and Written Opinion—PCT/US2022/074318—ISA/EPO—Oct. 19, 2022.
(Continued)

*Primary Examiner* — Nicholas R Taylor
*Assistant Examiner* — Chong G Kim
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information identifying a transmission configuration indicator (TCI) state mode, wherein the TCI state mode is a first TCI state mode or a second TCI state mode. The UE may communicate using a beam associated with the TCI state mode. Numerous other aspects are described.

28 Claims, 12 Drawing Sheets

(56) References Cited

OTHER PUBLICATIONS

MCC Support: "Draft Report of 3GPP TSG RAN WG1 #105-e v0.2.0 (Online Meeting, May 10-27, 2021)", R1-210xxxx, Draft_Minutes_Report_RAN1#105-E_V020, 3rd Generation Partnership Project, Mobile Competence Centre, 650, Route Des Lucioles, F-06921 Sophia-Antipolis Cedex, France vol. RAN WG1, No. e-Meeting, Aug. 16, 2021-Aug. 27, 2021, Jul. 13, 2021, 141 Pages, XP052101972, p. 38, Paragraph Referring to R1-2106131, p. 40.
Spreadtrum Communications: "Enhancements on Multi-beam Operation", 3GPP TSG RAN WG1 #105-e, R1-2104411, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 11, 2021, 9 Pages, XP052006160, Section 2.1.

\* cited by examiner

US 12,349,169 B2

USER EQUIPMENT CAPABILITY-BASED TRANSMISSION CONFIGURATION INDICATOR STATE CONFIGURATION

CROSS-REFERENCE TO RELATED APPLICATION

This patent application claims priority to U.S. Provisional Patent Application No. 63/260,037, filed on Aug. 6, 2021, entitled "USER EQUIPMENT CAPABILITY-BASED TRANSMISSION CONFIGURATION INDICATOR STATE CONFIGURATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for user equipment (UE) capability-based transmission configuration indicator (TCI) state configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Different versions of beam indication may be applicable to different use cases in a communication network. For example, Third Generation Partnership Project (3GPP) Release 15 (R15)-type beam indication provides for single-use beam indication (e.g., indication of a single beam for a single channel in a single communication instance). 3GPP Release 16 (R16)-type beam indication is defined for multi-transmit receive point (TRP) (mTRP) communication deployments. 3GPP Release 17 (R17)-type beam indication is defined for joint indication of uplink and downlink beams. Some use cases for a user equipment (UE) may not be compatible with a particular version of beam indication. For example, some use cases may be compatible with R16-type beam indication (e.g., an mTRP use case), but other use cases may not be compatible with R16-type beam indication. As a result, configuring a network entity (e.g., a base station) and UE to use a single type of beam indication may preclude use in use cases not covered by that type of beam indication. Alternatively, some types of beam indication may be more efficient for a network in some use cases. Accordingly, configuring a network entity and UE to use a single type of beam indication may reduce network efficiency by preventing use of a more efficient type of beam indication (e.g., fewer signals, less overhead in the signals, etc.) for a particular use case. Additionally, in some cases, a maximum quantity of allowed pathloss reference signals may be less than a quantity of active uplink TCI states. In such cases, a beam misalignment event may occur, communication in connection with which may or may not be supported by a UE, as described in more detail herein.

Some aspects described herein relate to a user UE for wireless communication. The UE may include a memory and one or more processors coupled to the memory. The one or more processors may be configured to transmit a report including a UE capability indicator identifying a capability of the UE associated with a transmission configuration indicator (TCI) state. The one or more processors may be configured to receive configuration information associated with a beam, wherein the beam is associated with a value of the UE capability indicator in the report.

Some aspects described herein relate to a network entity for wireless communication. The network entity may include a memory and one or more processors coupled to the memory. The one or more processors may be configured to receive, from a UE, a report including a UE capability indicator identifying a capability of the UE associated with a TCI state. The one or more processors may be configured to transmit configuration information associated with a beam, wherein the beam is associated with a value of the UE capability indicator in the report.

Some aspects described herein relate to a method of wireless communication performed by a UE. The method may include transmitting a report including a UE capability indicator identifying a capability of the UE associated with a TCI state. The method may include receiving configuration information associated with a beam, wherein the beam is associated with a value of the UE capability indicator in the report.

Some aspects described herein relate to a method of wireless communication performed by a network entity. The method may include receiving, from a UE, a report including a UE capability indicator identifying a capability of the UE associated with a TCI state. The method may include transmitting configuration information associated with a beam, wherein the beam is associated with a value of the UE capability indicator in the report.

Some aspects described herein relate to a non-transitory computer-readable medium that stores a set of instructions for wireless communication by a UE. The set of instructions, when executed by one or more processors of the UE, may cause the UE to transmit a report including a UE capability indicator identifying a capability of the UE associated with a TCI state. The set of instructions, when executed by one or more processors of the UE, may cause the UE to receive configuration information associated with a beam, wherein the beam is associated with a value of the UE capability indicator in the report.

Some aspects described herein relate to a non-transitory computer-readable medium that stores a set of instructions for wireless communication by a network entity. The set of instructions, when executed by one or more processors of the network entity, may cause the network entity to receive, from a UE, a report including a UE capability indicator identifying a capability of the UE associated with a TCI state. The set of instructions, when executed by one or more processors of the network entity, may cause the network entity to transmit configuration information associated with a beam, wherein the beam is associated with a value of the UE capability indicator in the report.

Some aspects described herein relate to an apparatus for wireless communication. The apparatus may include means for transmitting a report including a UE capability indicator identifying a capability of the UE associated with a TCI state. The apparatus may include means for receiving configuration information associated with a beam, wherein the beam is associated with a value of the UE capability indicator in the report.

Some aspects described herein relate to an apparatus for wireless communication. The apparatus may include means for receiving, from a UE, a report including a UE capability indicator identifying a capability of the UE associated with a TCI state. The apparatus may include means for transmitting configuration information associated with a beam, wherein the beam is associated with a value of the UE capability indicator in the report.

Some aspects described herein relate to a method of wireless communication performed by a UE. The method may include receiving configuration information identifying a TCI state mode, wherein the TCI state mode is a first TCI state mode or a second TCI state mode. The method may include communicating using a beam associated with the TCI state mode.

Some aspects described herein relate to a method of wireless communication performed by a network entity. The method may include transmitting configuration information identifying a TCI state mode, wherein the TCI state mode is a first TCI state mode or a second TCI state mode. The method may include communicating using a beam associated with the TCI state mode.

Some aspects described herein relate to a UE for wireless communication. The user equipment may include a memory and one or more processors coupled to the memory. The one or more processors may be configured to receive configuration information identifying a TCI state mode, wherein the TCI state mode is a first TCI state mode or a second TCI state mode. The one or more processors may be configured to communicate using a beam associated with the TCI state mode.

Some aspects described herein relate to a network entity for wireless communication. The network entity may include a memory and one or more processors coupled to the memory. The one or more processors may be configured to transmit configuration information identifying a TCI state mode, wherein the TCI state mode is a first TCI state mode or a second TCI state mode. The one or more processors may be configured to communicate using a beam associated with the TCI state mode.

Some aspects described herein relate to a non-transitory computer-readable medium that stores a set of instructions for wireless communication by a UE. The set of instructions, when executed by one or more processors of the UE, may cause the UE to receive configuration information identifying a TCI state mode, wherein the TCI state mode is a first TCI state mode or a second TCI state mode. The set of instructions, when executed by one or more processors of the UE, may cause the UE to communicate using a beam associated with the TCI state mode.

Some aspects described herein relate to a non-transitory computer-readable medium that stores a set of instructions for wireless communication by a network entity. The set of instructions, when executed by one or more processors of the network entity, may cause the network entity to transmit configuration information identifying a TCI state mode, wherein the TCI state mode is a first TCI state mode or a second TCI state mode. The set of instructions, when executed by one or more processors of the network entity, may cause the network entity to communicate using a beam associated with the TCI state mode.

Some aspects described herein relate to an apparatus for wireless communication. The apparatus may include means for receiving configuration information identifying a TCI state mode, wherein the TCI state mode is a first TCI state mode or a second TCI state mode. The apparatus may include means for communicating using a beam associated with the TCI state mode.

Some aspects described herein relate to an apparatus for wireless communication. The apparatus may include means for transmitting configuration information identifying a TCI state mode, wherein the TCI state mode is a first TCI state mode or a second TCI state mode. The apparatus may include means for communicating using a beam associated with the TCI state mode.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
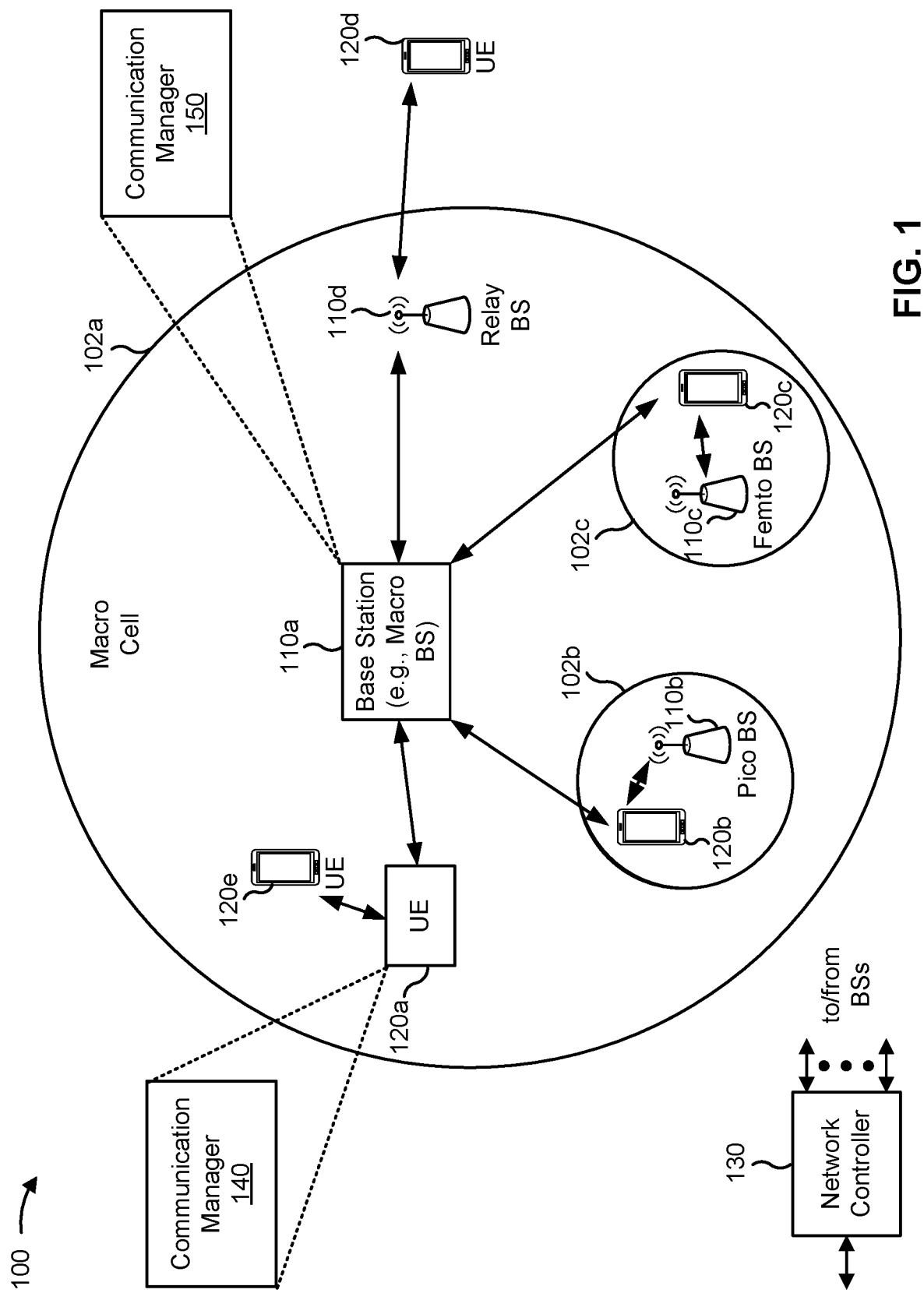
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

In some aspects, a network entity (e.g., the base station 110) may serve different UEs (e.g., UEs 120) of different categories and/or different UEs that support different capabilities. For example, the network entity may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category, and may be referred to as a reduced capability (RedCap) UE, a low tier UE, and/or an NR-Lite UE, among other examples. A UE of the first category may be, for example, an machine type communication (MTC) UE, an enhanced MTC (eMTC) UE, and/or an Internet-of-Things (IoT) UE, as described above in connection with FIG. 1. A UE of the second category may have an advanced feature set compared to UEs of the second category, and may be referred to as a baseline UE, a high tier UE, an NR UE, and/or a premium UE, among other examples. In some aspects, a UE of the first category has capabilities that satisfy requirements of a first (earlier) wireless communication standard but not a second (later) wireless communication standard, while a UE of the second category has capabilities that satisfy requirements of the second (later) wireless communication standard (and also the first wireless communication standard, in some cases).

For example, UEs of the first category may support a lower maximum modulation and coding scheme (MCS) than UEs of the second category (e.g., quadrature phase shift keying (QPSK) or the like as compared to 256-quadrature amplitude modulation (QAM) or the like), may support a lower maximum transmit power than UEs of the second category, may have a less advanced beamforming capability than UEs of the second category (e.g., may not be capable of forming as many beams as UEs of the second category), may require a longer processing time than UEs of the second category, may include less hardware than UEs of the second category (e.g., fewer antennas, fewer transmit antennas, and/or fewer receive antennas), and/or may not be capable of communicating on as wide of a maximum bandwidth part as UEs of the second category, among other examples. Additionally, or alternatively, UEs of the second category may be capable of communicating using a shortened transmission time interval (TTI) (e.g., a slot length of 1 ms or less, 0.5 ms, 0.25 ms, 0.125 ms, 0.0625 ms, or the like, depending on a sub-carrier spacing), and UEs of the first category may not be capable of communicating using the shortened TTI.

Some UEs 120 may be considered MTC or eMTC UEs. An MTC UE and/or an eMTC UE may include, for example, a robot, a drone, a remote device, a sensor, a meter, a monitor, and/or a location tag, that may communicate with a network entity (e.g., the base station 110), another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit a report including a UE capability indicator identifying a capability of the UE associated with a transmission configuration indicator (TCI) state; and receive configuration information associated with a beam, wherein the beam is associated with a value of the UE capability indicator in the report. As described in more detail elsewhere herein, the communication manager 140 may receive configuration information identifying a TCI state mode, wherein the TCI state mode is a first TCI state mode or a second TCI state mode; and communicate using a beam associated with the TCI state mode. Additionally, or alternatively, the communication manager 140 may perform one or more other operations described herein.

In some aspects, a network entity (e.g., the base station 110) may include a communication manager 150. As described in more detail elsewhere herein, the communication manager 150 may receive, from a UE, a report including a UE capability indicator identifying a capability of the UE associated with a TCI state; and transmit configuration information associated with a beam, wherein the beam is associated with a value of the UE capability indicator in the report. As described in more detail elsewhere herein, the communication manager 150 may transmit configuration information identifying a transmission configuration indicator (TCI) state mode, wherein the TCI state mode is a first TCI state mode or a second TCI state mode; and communicate using a beam associated with the TCI state mode. Additionally, or alternatively, the communication manager 150 may perform one or more other operations described herein.

As indicated above, FIG. 1 is provided as an example. Other examples may differ from what is described with regard to FIG. 1.

Figure 2:
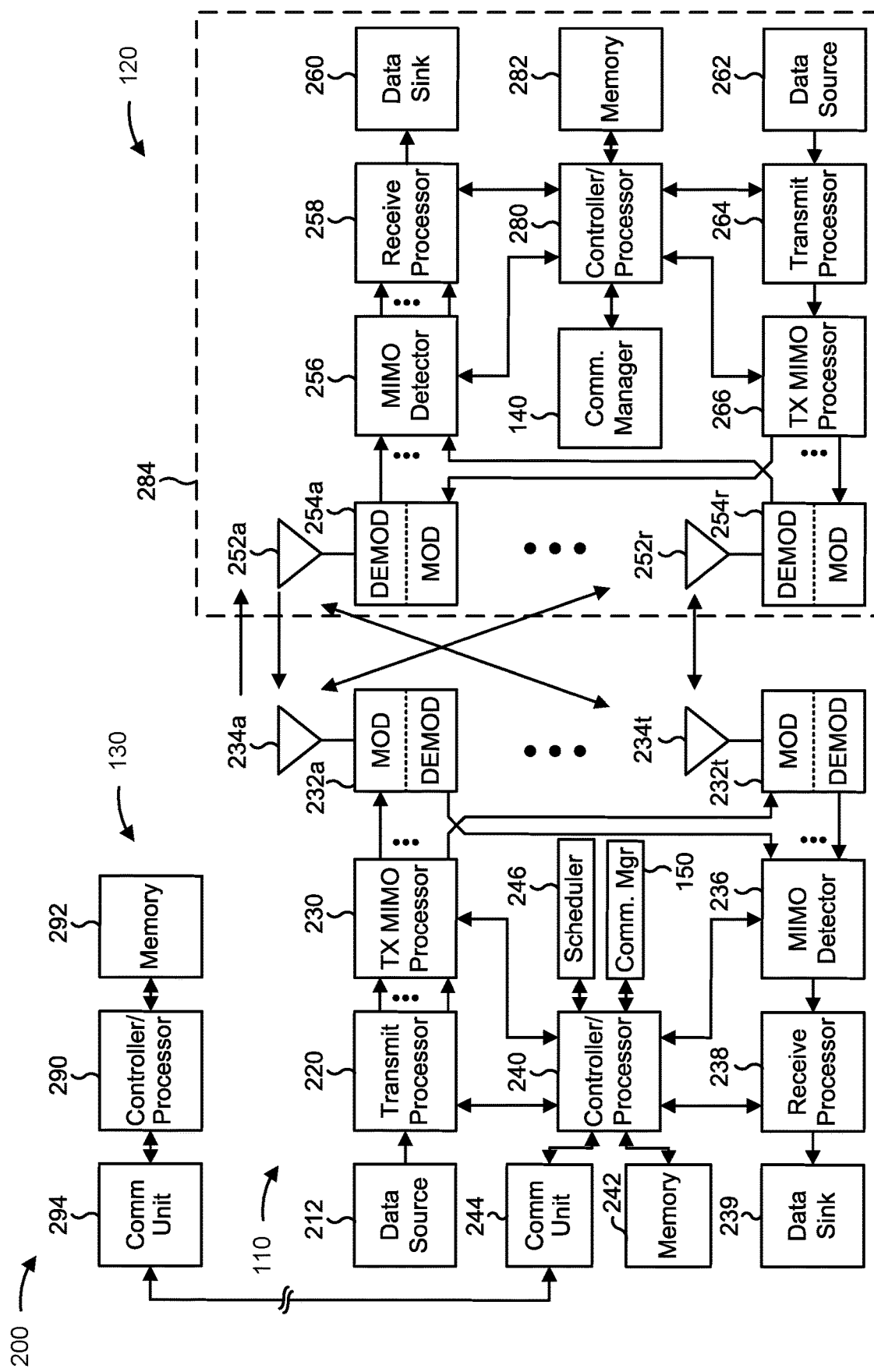
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more MCSs for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with UE capability-based TCI state configuration, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, the process 1100 of FIG. 11, the process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, the process 1100 of FIG. 11, the process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for transmitting a report including a UE capability indicator identifying a capability of the UE associated with a TCI state; and/or means for receiving configuration information associated with a beam, wherein the beam is associated with a value of the UE capability indicator in the report. In some aspects, the UE 120 includes means for receiving configuration information identifying a TCI state mode, wherein the TCI state mode is a first TCI state mode or a second TCI state mode; and/or means for communicating using a beam associated with the TCI state mode. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., the base station 110) includes means for receiving, from a UE, a report including a UE capability indicator identifying a capability of the UE associated with a TCI state; and/or means for transmitting configuration information associated with a beam, wherein the beam is associated with a value of the UE capability indicator in the report. In some aspects, the network entity includes means for transmitting configuration information identifying a TCI state mode, wherein the TCI state mode is a first TCI state mode or a second TCI state mode; and/or means for communicating using a beam associated with the TCI state mode. The means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
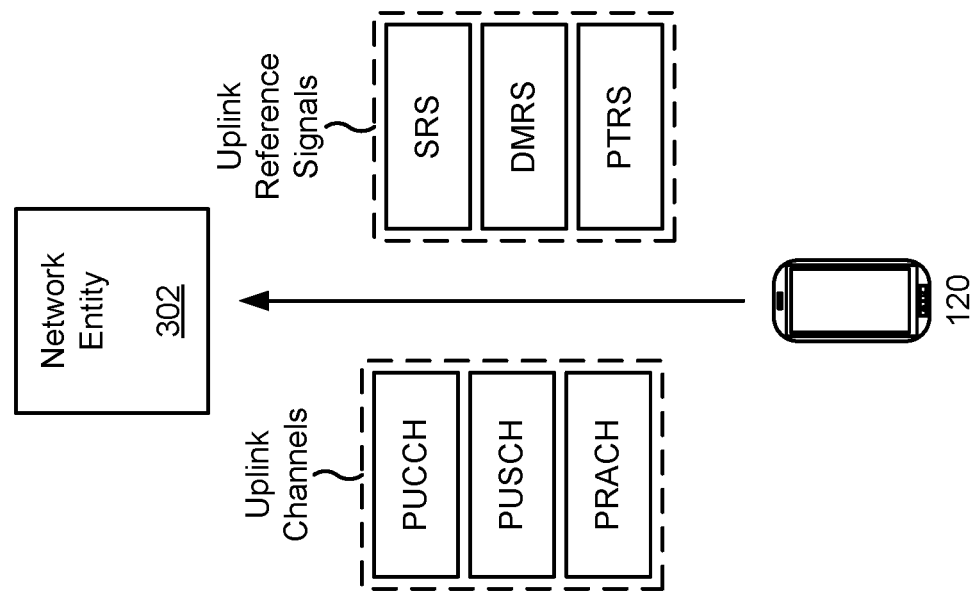
FIG. 3 is a diagram illustrating an example of physical channels and reference signals in a wireless network, in accordance with the present disclosure.
Figure 3:
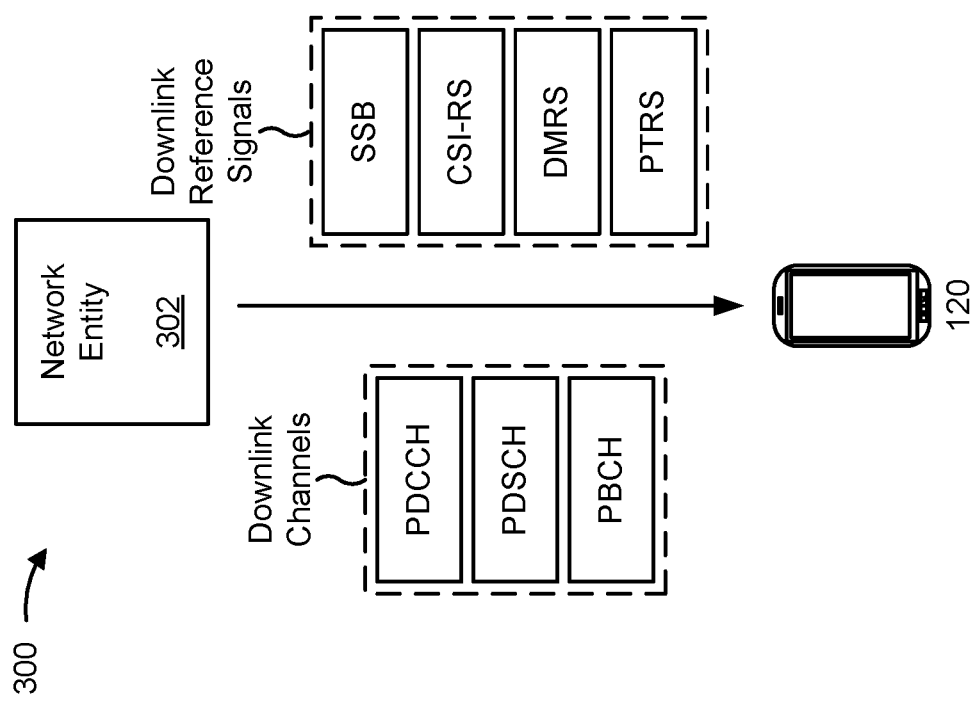

FIG. 3 is a diagram illustrating an example 300 of physical channels and reference signals in a wireless network, in accordance with the present disclosure. As shown in FIG. 3, downlink channels and downlink reference signals may carry information from a network entity 302 (e.g., which may correspond to a base station 110) to a UE 120, and uplink channels and uplink reference signals may carry information from a UE 120 to a network entity 302.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. The UE 120 may transmit acknowledgement (ACK) or negative acknowledgement (NACK) feedback (e.g., ACK/NACK feedback or ACK/NACK information) in UCI on the PUCCH and/or the PUSCH. Beams associated with the downlink channels and the uplink channels may be linked. For example, a TCI state may identify beam parameters for a downlink beam or an uplink beam, a pair of downlink beams or uplink beams, or another quantity of downlink beams and uplink beams, among other examples, as described in more detail herein.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. The network entity 302 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network entity 302 may configure a set of CSI-RSs for the UE 120, and the UE 120 may measure the configured set of CSI-RSs. Based at least in part on the measurements, the UE 120 may perform channel estimation and may report channel estimation parameters to the network entity 302 (e.g., in a CSI report), such as a CQI, a precoding matrix indicator (PMI), a CSI-RS resource indicator (CRI), a layer indicator (LI), a rank indicator (RI), or an RSRP, among other examples. The network entity 302 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network entity 302 to improve observed time difference of arrival (OTDOA) positioning performance. For example, a PRS may be a pseudo-random QPSK sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network entities in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. The network entity 302 may then calculate a position of the UE 120 based on the RSTD measurements reported by the UE 120.

An SRS may carry information used for uplink channel estimation, which may be used for scheduling, link adaptation, precoder selection, or beam management, among other examples. The network entity 302 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network entity 302 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
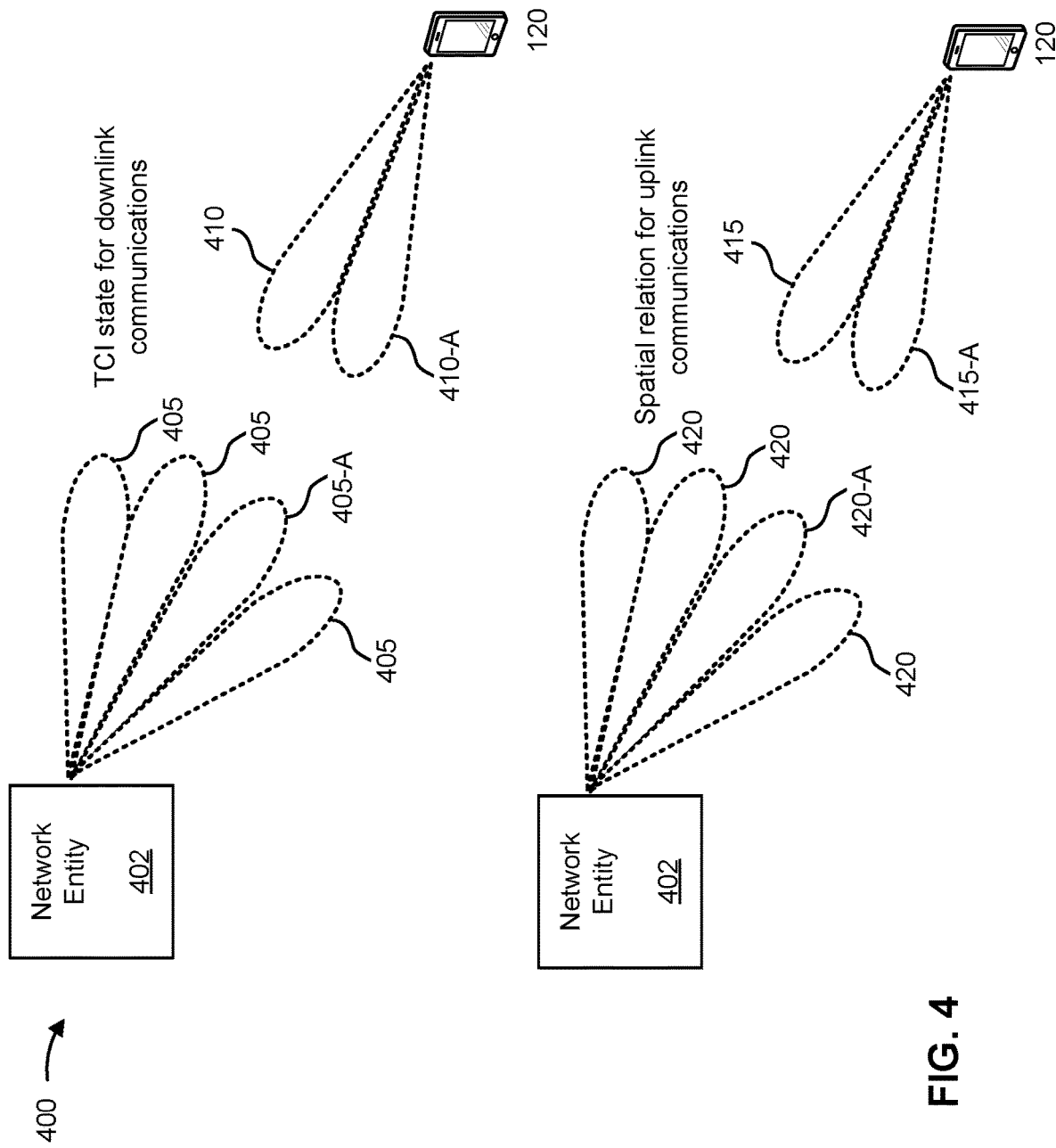
FIG. 4 is a diagram illustrating an example of using beams for communications between a base station and a UE, in accordance with the present disclosure.

FIG. 4 is a diagram illustrating an example 400 of using beams for communications between a network entity and a UE, in accordance with the present disclosure. As shown in FIG. 4, a network entity 402 and a UE 120 may communicate with one another.

The network entity 402 may transmit to UEs 120 located within a coverage area of the network entity 402. The network entity 402 and the UE 120 may be configured for beamformed communications, where the network entity 402 may transmit in the direction of the UE 120 using a directional transmit beam (e.g., a base station (BS) or network entity (NE) transmit beam), and the UE 120 may receive the transmission using a directional UE receive beam. Each transmit beam may have an associated beam ID, beam direction, or beam symbols, among other examples. The network entity 402 may transmit downlink communications via one or more transmit beams 405.

The UE 120 may attempt to receive downlink transmissions via one or more UE receive beams 410, which may be configured using different beamforming parameters at receive circuitry of the UE 120. The UE 120 may identify a particular transmit beam 405 (e.g., a BS transmit beam or an NE transmit beam), shown as transmit beam 405-A, and a particular UE receive beam 410, shown as UE receive beam 410-A, that provide relatively favorable performance (for example, that have a best channel quality of the different measured combinations of transmit beams 405 and UE receive beams 410). In some examples, the UE 120 may transmit an indication of which transmit beam 405 is identified by the UE 120 as a preferred transmit beam, which the network entity 402 may select for transmissions to the UE 120. The UE 120 may thus attain and maintain a beam pair link (BPL) with the network entity 402 for downlink communications (for example, a combination of the transmit beam 405-A and the UE receive beam 410-A), which may be further refined and maintained in accordance with one or more established beam refinement procedures.

A downlink beam, such as a transmit beam 405 or a UE receive beam 410, may be associated with a TCI state. A TCI state may indicate a directionality or a characteristic of the downlink beam, such as one or more Quasi-Colocation (QCL) properties of the downlink beam. A QCL property may include, for example, a Doppler shift, a Doppler spread, an average delay, a delay spread, or spatial receive parameters, among other examples. In some examples, each transmit beam 405 may be associated with an SSB, and the UE 120 may indicate a preferred transmit beam 405 by transmitting uplink transmissions in resources of the SSB that are associated with the preferred transmit beam 405. A particular SSB may have an associated TCI state (for example, for an antenna port or for beamforming). The network entity 402 may, in some examples, indicate a downlink transmit beam 405 based at least in part on antenna port QCL properties that may be indicated by the TCI state. A TCI state may be associated with one downlink reference signal set (for example, an SSB and an aperiodic, periodic, or semi-persistent CSI-RS) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the network entity 402 indicating a transmit beam 405 via a TCI indication.

The network entity 402 may maintain a set of activated TCI states for downlink shared channel transmissions and a set of activated TCI states for downlink control channel transmissions. The set of activated TCI states for downlink shared channel transmissions may correspond to beams that the network entity 402 uses for downlink transmission on a PDSCH. The set of activated TCI states for downlink control channel communications may correspond to beams that the network entity 402 may use for downlink transmission on a PDCCH or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the network entity 402 using a directional UE transmit beam, and the network entity 402 may receive the transmission using a directional receive beam (e.g., a BS receive beam or an NE receive beam). Each UE transmit beam may have an associated beam ID, beam direction, or beam symbols, among other examples. The UE 120 may transmit uplink communications via one or more UE transmit beams 415.

The network entity 402 may receive uplink transmissions via one or more receive beams 420 (e.g., a BS receive beam or an NE receive beam). The network entity 402 may identify a particular UE transmit beam 415, shown as UE transmit beam 415-A, and a particular receive beam 420, shown as receive beam 420-A, that provide relatively favorable performance (for example, that have a best channel quality of the different measured combinations of UE transmit beams 415 and receive beams 420). In some examples, the network entity 402 may transmit an indication of which UE transmit beam 415 is identified by the network entity 402 as a preferred UE transmit beam, which the network entity 402 may select for transmissions from the UE 120. The UE 120 and the network entity 402 may thus attain and maintain a BPL for uplink communications (for example, a combination of the UE transmit beam 415-A and the receive beam 420-A), which may be further refined and maintained in accordance with one or more established beam refinement procedures. An uplink beam, such as a UE transmit beam 415 or a receive beam 420, may be associated with a spatial relation. A spatial relation may indicate a directionality or a characteristic of the uplink beam, similar to one or more QCL properties, as described above.

Different forms of beam indication, as described above, have been proposed for different use cases. Under 3GPP Release 15 (R15 or Rel-15), TCI states are used for downlink beam indication, as described in more detail with regard to 3GPP Technical Specification (TS) 38.214, Release 15, Version 15.13.0. In R15, uplink beam indication is performed using spatial relation information or a spatial relation indicator (SRI). In R15, both downlink and uplink beam indications are applicable to a single channel for, for example, a single communication period. For example, a network entity may transmit DCI including information identifying a TCI state for a PDSCH scheduled by the DCI. Under 3GPP Release 16 (R16 or Rel-16), beam indication is configured for mTRP operation, as described in more detail with regard to 3GPP TS 38.214, Release 16, Version 16.6.0. For example, a TCI field may include a codepoint that identifies a pair of TCI states using a single TCI field. In this case, the pair of TCI states apply to a pair of beams from a single TRP operating in an mTRP deployment. For example, a TCI field may identify an uplink beam for a TRP to communicate with a parent TRP and a downlink beam for the TRP to communicate with a child TRP. Additionally, or alternatively, the TCI field may identify a pair of downlink beams for the TRP to communicate with a pair of child TRPs (or with a single child TRP using two separate links). Generally, R16 TCI may be applicable to PDSCH transmission.

Under 3GPP Release 17 (R17 or Rel-17), bidirectional beam indication may be configured. For example, a single TCI state may identify both an uplink beam and a downlink beam (thereby obviating a need for spatial relation information or an SRI). Examples of R17 TCI states may be found, in more detail, in 3GPP, "Final Report of 3GPP TSG RAN WG1 #103-e v1.0.0", R1-2100001, (Chairman's Notes). Future agreements regarding beam indication may provide other types of TCI states, apply TCI states to other types of channels or signaling paths, or enable commonality between additional quantities of beams or beam parameters, among other examples.

As indicated above, FIG. 4 is provided as an example. Other examples may differ from what is described with respect to FIG. 4.

Different versions of beam indication may be applicable to different use cases. For example, R15-type beam indication provides for single-use beam indication (e.g., indication of a single beam for a single channel in a single communication instance). Similarly, R16-type beam indication is defined for mTRP communication deployments. Similarly, R17-type beam indication is defined for joint indication of uplink and downlink beams. Many other possible use cases have been proposed and implemented using R15-type, R16-type, and R17-type beam indication. Although there may be some overlap between versions of beam indication, in some cases there may not be overlap between different versions of beam indication. As a result, configuring a network entity and UE to use a single type of beam indication may preclude use in scenarios not covered by that type of beam indication. Additionally, in some cases, a maximum quantity of allowed pathloss reference signals may be less than a quantity of active uplink TCI states. In such cases, a beam misalignment event may occur, communication in connection with which may or may not be supported by a UE, as described in more detail herein.

Some aspects described herein enable mixed usage of different versions of beam indication. For example, a UE may provide a UE capability indicator identifying a type of beam indication for which the UE is configured or a type of beam indication that is applicable to a use case for which the UE is configured, and a network entity may provide a beam indication that can be interpreted in accordance with the indicated type of beam indication to enable the UE to identify a beam for communication. In other words, a UE may request use of a particular version of beam indication, the network entity may provide control information to configure a particular beam for the UE, and the UE may interpret the control information in accordance with the particular version of beam indication. In this case, the UE may select the particular beam based at least in part on the UE and the network entity both operating in accordance with the particular version of beam indication.

As a particular example, a reduced capability (RedCap) UE may be configured and may use R17-type beam indication for some transmissions and may, in some cases, transmit UE capability information to switch to using R15-type beam indications or R16-type beam indications for other transmissions. In this way, the RedCap UE enables satisfaction of power management requirements, latency requirements, or reliability requirements, among other examples that may be defined for a service being provided by the RedCap UE. Additionally, or alternatively, a UE may provide a UE capability indicator identifying whether the UE supports a beam misalignment between a downlink source reference signal in an uplink or joint TCI state and a pathloss reference signal. In this case, a network entity may configure the downlink source reference signal based at least in part on the UE capability.

Figure 5:
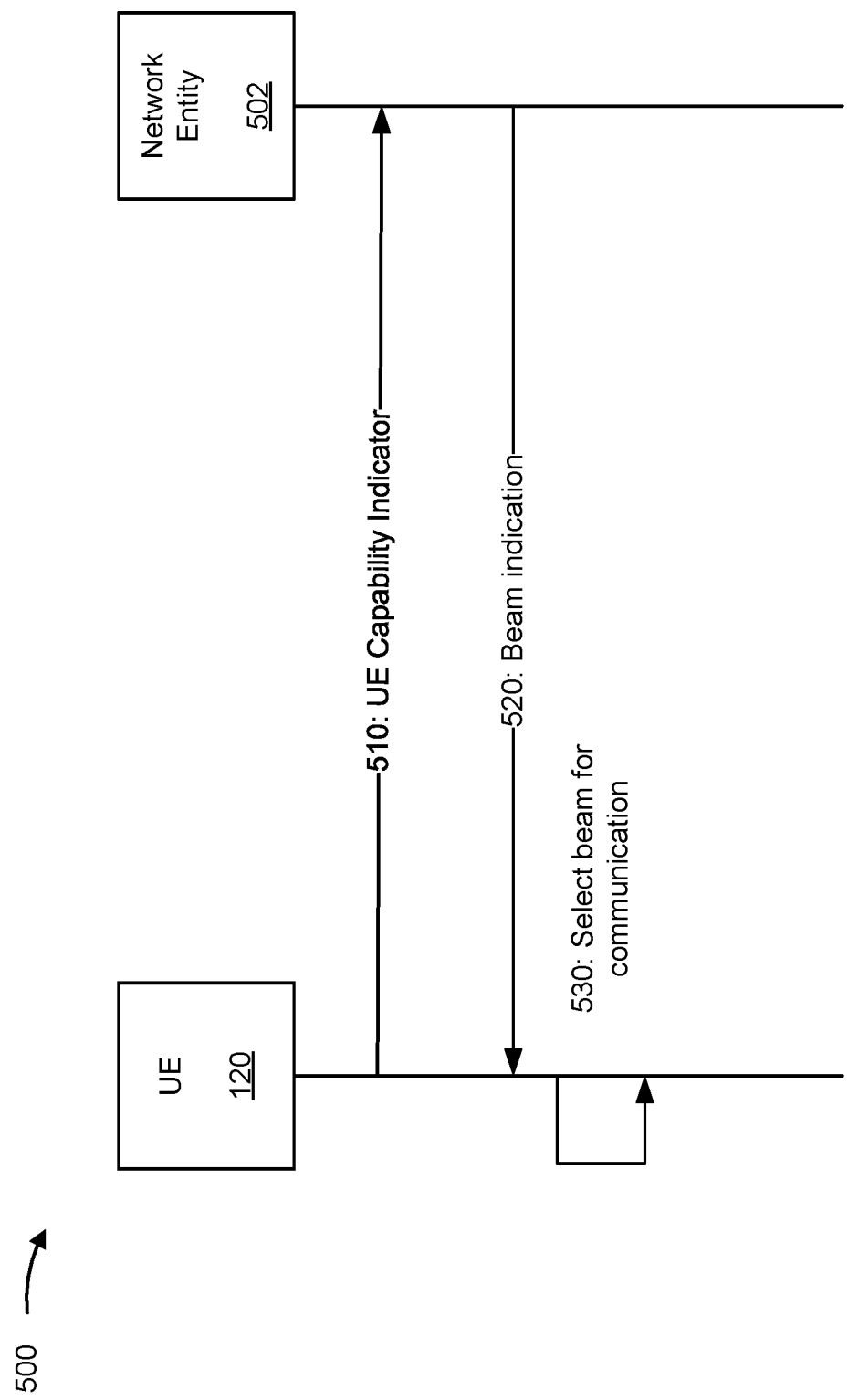
FIG. 5 is a diagram illustrating an example associated with UE capability-based transmission configuration indicator (TCI) state configuration, in accordance with the present disclosure.

FIG. 5 is a diagram illustrating an example 500 associated with UE capability-based TCI state configuration, in accordance with the present disclosure. As shown in FIG. 5, example 500 includes communication between a network entity 502 and a UE 120. In some aspects, the network entity 502 and the UE 120 may be included in a wireless network, such as wireless network 100. The network entity 502 and the UE 120 may communicate via a wireless access link, which may include an uplink and a downlink.

As further shown in FIG. 5, and by reference number 510, the UE 120 may transmit a UE capability indicator to the network entity 502. For example, the UE 120 may transmit a UE capability indicator indicating support of one or more modes of operation in which one or more versions of beam indication are enabled. In this case, the UE 120 may indicate support for unified TCI states (e.g., R17-type beam indication), TCI states and/or spatial relations (e.g., R15-type or R16-type beam indication), or another type of beam indication (e.g., a later release beam indication, such as a Release 18, a Release 19, or any other later release). Additionally, or alternatively, the UE 120 may indicate support for a non-standardized type of beam indication (e.g., a type of beam indication that may be supported by the network entity 502 and the UE 120, such as the network entity 502 configuring the UE 120 with the type of beam indication).

In some aspects, the UE 120 may transmit a capability indicator identifying whether the UE 120 supports a beam misalignment event. In one example, a beam misalignment event may occur when a spatial relation reference signal in a TCI state is not a QCL type-D reference signal of a pathloss reference signal (when a QCL type-D reference signal is indicated for the pathloss reference signal). In a second example, the beam misalignment event may occur when a spatial relation reference signal in a TCI state is not a pathloss reference signal (when a QCL type-D reference signal of a pathloss reference signal is not indicated) (e.g., the pathloss reference signal is an SSB or CSI-RS without a TCI state). In the case of a beam misalignment event, a maximum quantity of pathloss reference signals may be less than a quantity of active uplink TCI states at a UE.

As further shown in FIG. 5, and by reference number 520, the UE 120 may receive a beam indication from the network entity 502. For example, the network entity 502 may transmit signaling configuring a beam, such as by transmitting an indicator of a unified TCI state (e.g., R17-type beam indication), an indicator of a TCI state or spatial relation (e.g., a R15-type or R16-type beam indication), or another other type of beam indication, as described herein. In some implementations, the network entity 502 may transmit signaling configuring a single type of TCI state. For example, the network entity 502 may configure only either R17-type TCI states or R15/R16-type TCI states and spatial relations. In other words, when the UE 120 is configured with a R17-type TCI in any carrier (e.g., a component carrier) in a band (e.g., FR2), the UE 120 may not receive an R15-type beam indication or an R-16 type beam indication. In contrast, when the UE 120 receives an R15-type beam indication (e.g., a TCI, a spatial relationship information indicator, or a PUCCH spatial relationship information indicator), the UE 120 may not receive an R-17 type beam indication configuring R-17 TCI in carriers of the same band for which the R15-type beam indication was applicable.

In some aspects, the UE 120 may be configured with different TCI state modes corresponding to different types of TCI states in different bands. For example, the UE 120 may receive an indicator of an R17-type TCI state for a first band (e.g., FR1) and may be configured with an R15/R16-type TCI state for a second band (e.g., FR2).

Additionally, or alternatively, the network entity 502 may transmit signaling configuring the beam in connection with a beam misalignment event. For example, based at least in part on the UE capability indicator, the network entity 502 may configure a spatial relation reference signal as a QCL type-D reference signal of a pathloss reference, a spatial relation reference signal as other than the QCL type-D reference signal of a pathloss reference signal, as a pathloss reference signal, or as other than a pathloss reference signal, among other examples.

In some aspects, the network entity 502 may transmit the signaling based at least in part on receiving the UE capability indicator. Alternatively, the network entity 502 may transmit the signaling without receiving the UE capability indicator, such as based at least in part on a type of the UE 120, a subscriber identity of the UE 120, or a periodic trigger (e.g., network entity 502 may autonomously determine to set a version of beam indication), among other examples.

In some aspects, the UE 120 may report a UE capability (e.g., for a mode of beam indication, such as R15-type, R16-type, or R17-type beam indication) on a per use case basis. For example, when operating in a single TRP deployment, the UE 120 may report a capability of a beam indication mode associated with single TRP beam indication (e.g., any of R15-type, R16-type, or R17-type beam indication). In contrast, when the UE 120 is in a multiple TRP (multi-TRP) deployment, the UE 120 may report a capability of a beam indication mode associated with multi-TRP beam indication (e.g., R15-type or R16-type beam indication). Additionally, or alternatively, the UE 120 may report a UE capability on a per direction basis. For example, the UE 120 may report a first UE capability for R15-type or R16-type beam indication on a first link (e.g., an uplink) and a second UE capability for R17-type beam indication on a second link (e.g., a downlink).

In some aspects, the network entity 502 may set a particular operation mode relating to a version of beam indication. For example, the network entity 502 may set and signal to the UE 120 an operation mode in which R15-type or R16-type beam indication occurs and R17-type beam indication does not occur. As another example, the network entity 502 may set and signal to the UE 120 an operation mode in which R17-type beam indication occurs and R15-type and R16-type beam indication does not occur. In other words, as described above, when the UE 120 is in the operation mode for R17-type beam indication (and is configured with an R17-type TCI in any carrier in a band), the UE 120 may not be configured with R15-type or R16-type beam indication. As another example, the network entity 502 may indicate that either R17-type beam indication or R15-type or R16-type beam indication is enabled at a particular time for all beams or channels. As another example, the network entity 502 may indicate that either R17-type beam indication is enabled for a first subset of beams or channels or R15-type or R16-type beam indication is enabled at a particular time for a second subset of beams or channels. In other words, the network entity 502 may configure a mode of operation on a per beam basis or a per channel basis. Additionally, or alternatively, the network entity 502 may configure the mode of operation on a per time period basis (e.g., R17-type beam indication is enabled at a first time and R15-type or R16-type beam indication is enabled at a second time), a per UE basis, a per direction basis (e.g., uplink, downlink, or sidelink, among other examples) a per link basis (e.g., a first mode for a first uplink link and a second mode for a second uplink link), or another granularity for enabling or disabling different types of beam indication. In some implementations, the particular operation mode may relate to which beams are indicated in a carrier list. For example, the UE 120 may receive a carrier (e.g., component carrier) list in an R16-type multi-beam indication and the R16-type multi-beam indication may not include any carrier that is in the same band that includes a carrier configured with an R17-type TCI (when different carrier lists are used for R16-type and R17-type beam indication). In other words, when different carrier lists are used for R16-type and R17-type beam indication and the UE 120 has received an R17-type beam indication configuring R17-type TCI in a carrier of a band, the UE 120 may not receive an R16-type beam indication identifying a carrier in that same band. Accordingly, if the UE 120 does receive an R16-type beam indication in the aforementioned scenario, the R16-type beam indication may be constrained to identify only carriers in a different band from the band that had a carrier with an R17-type TCI.

In some aspects, the network entity 502 may use dynamic signaling to set or activate a particular operation mode. For example, the network entity 502 may transmit RRC signaling to configure a first pool of beam indications (e.g., R17-type beam indication) and a second pool of beam indications (e.g., R15-type beam indications). In this case, the network entity 502 may transmit DCI as dynamic signaling to switch between the first pool of beam indications being active and the second pool of beam indications being active.

As further shown in FIG. 5, and by reference number 530, the UE 120 may select a beam for communication and may communicate using the selected beam. For example, the UE 120 may interpret a beam indication in accordance with R15, R16, or R17-type beam indication (or another type of beam indication, as described herein) based at least in part on the signaled UE capability. In this way, the UE 120 may derive beam parameters that the network entity 502 is indicating to the UE 120 for communication, thereby avoiding a lack of synchronization as may occur if the UE 120 were to derive beam parameters in accordance with a first type of beam indication but the network entity 502 signaled the beam parameters in accordance with a second type of beam indication. Based at least in part on avoiding a lack of synchronization, the UE 120 ensures that communications are not dropped, thereby improving network performance.

As indicated above, FIG. 5 is provided as an example. Other examples may differ from what is described with respect to FIG. 5.

Figure 6:
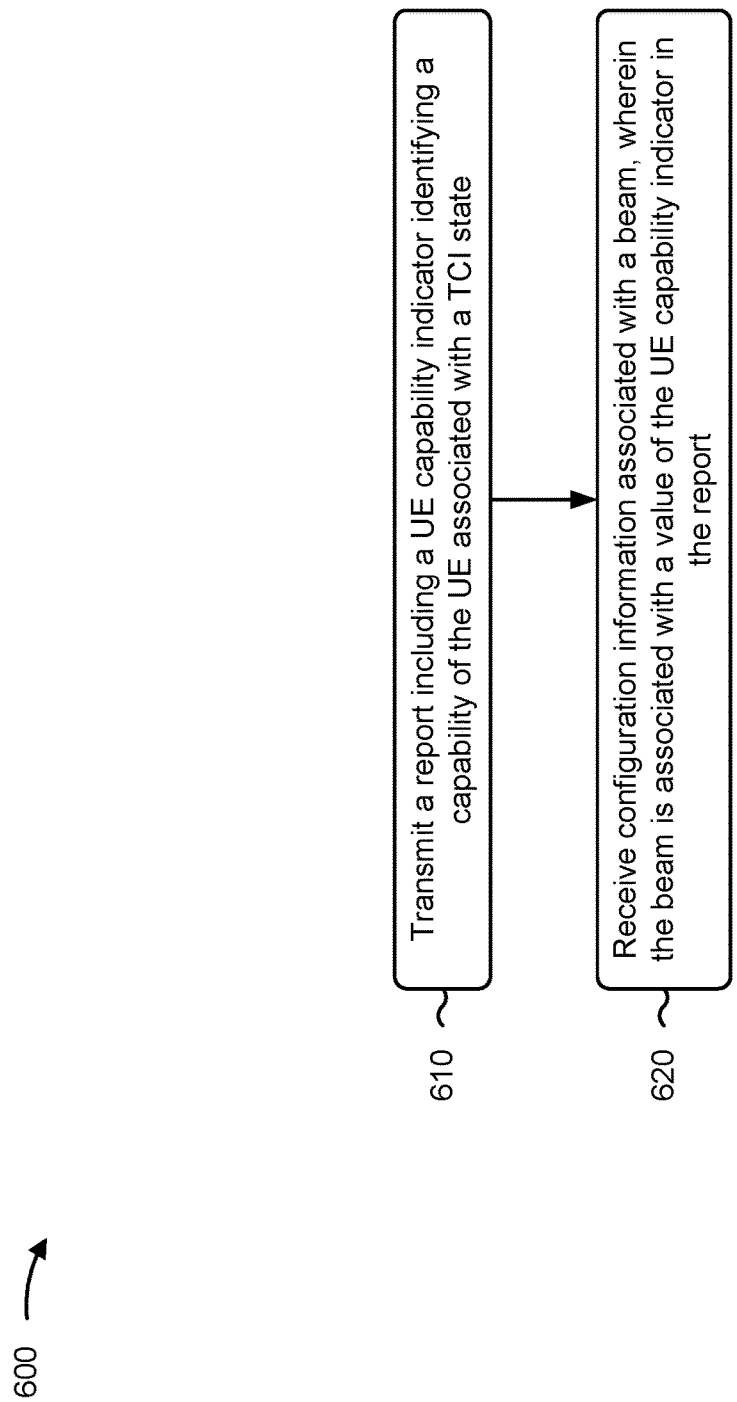
FIGS. 6-7 are diagrams illustrating example processes associated with UE capability-based TCI state configuration, in accordance with the present disclosure.

FIG. 6 is a diagram illustrating an example process 600 performed, for example, by a UE, in accordance with the present disclosure. Example process 600 is an example where the UE (e.g., the UE 120) performs operations associated with UE capability-based TCI state configuration.

As shown in FIG. 6, in some aspects, process 600 may include transmitting a report including a UE capability indicator identifying a capability of the UE associated with a TCI state (block 610). For example, the UE (e.g., using communication manager 140 and/or transmission component 804, depicted in FIG. 8) may transmit a report including a UE capability indicator identifying a capability of the UE associated with a TCI state, as described above.

As further shown in FIG. 6, in some aspects, process 600 may include receiving configuration information associated with a beam, wherein the beam is associated with a value of the UE capability indicator in the report (block 620). For example, the UE (e.g., using communication manager 140 and/or reception component 802, depicted in FIG. 8) may receive configuration information associated with a beam, wherein the beam is associated with a value of the UE capability indicator in the report, as described above.

Process 600 may include additional aspects, such as any single aspect or any combination of aspects described below and/or in connection with one or more other processes described elsewhere herein.

In a first aspect, the configuration information identifies a TCI state mode.

In a second aspect, alone or in combination with the first aspect, the TCI state mode is one of only a first type of beam indication with a first set of parameters, only a second type of beam indication with a second set of parameters, only a third type of beam indication with a third set of parameters, at least one of the first, second, or third type of beam indication for a group of beams, or a first one of the first, second, or third type of beam indication for a first beam of the group of beams and a second one of the first, second, or third type of beam indication for a second beam of the group of beams.

In a third aspect, alone or in combination with one or more of the first and second aspects, the value of the UE capability indicator in the report is associated with a deployment scenario of the UE.

In a fourth aspect, alone or in combination with one or more of the first through third aspects, the UE capability indicator is associated with a communication direction.

In a fifth aspect, alone or in combination with one or more of the first through fourth aspects, the report includes another UE capability indicator associated with another communication direction.

In a sixth aspect, alone or in combination with one or more of the first through fifth aspects, the configuration information identifies a set of TCI state modes, and further comprising receiving dynamic signaling switching between TCI state modes of the set of TCI state modes.

In a seventh aspect, alone or in combination with one or more of the first through sixth aspects, the UE capability indicator indicates whether the UE supports a configuration relating to a beam misalignment event.

In an eighth aspect, alone or in combination with one or more of the first through seventh aspects, the UE capability indicator indicates that the UE supports the configuration relating to the beam misalignment event, and wherein the configuration information indicates, for the beam, the configuration relating to the beam misalignment event.

In a ninth aspect, alone or in combination with one or more of the first through eighth aspects, the beam misalignment event is associated with a spatial relation reference signal in a TCI state not being a quasi-co-location type-D reference signal of a pathloss reference signal of an indicated quasi-co-location type-D reference signal of the pathloss reference signal.

In a tenth aspect, alone or in combination with one or more of the first through ninth aspects, the beam misalignment event is associated with a spatial relation reference signal in a TCI state not being a pathloss reference signal when there is no indicated quasi-co-location type-D reference signal of the pathloss reference signal.

In an eleventh aspect, alone or in combination with one or more of the first through tenth aspects, each carrier, of a band, that is configured with a TCI state mode of the set of TCI state modes, is configured with a common TCI state mode, of the set of TCI state modes, based at least in part on the dynamic signaling.

In a twelfth aspect, alone or in combination with one or more of the first through eleventh aspects, the configuration information is associated with a TCI state mode for a set of carriers, and the set of carriers does not include any carrier configured with another TCI state mode.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
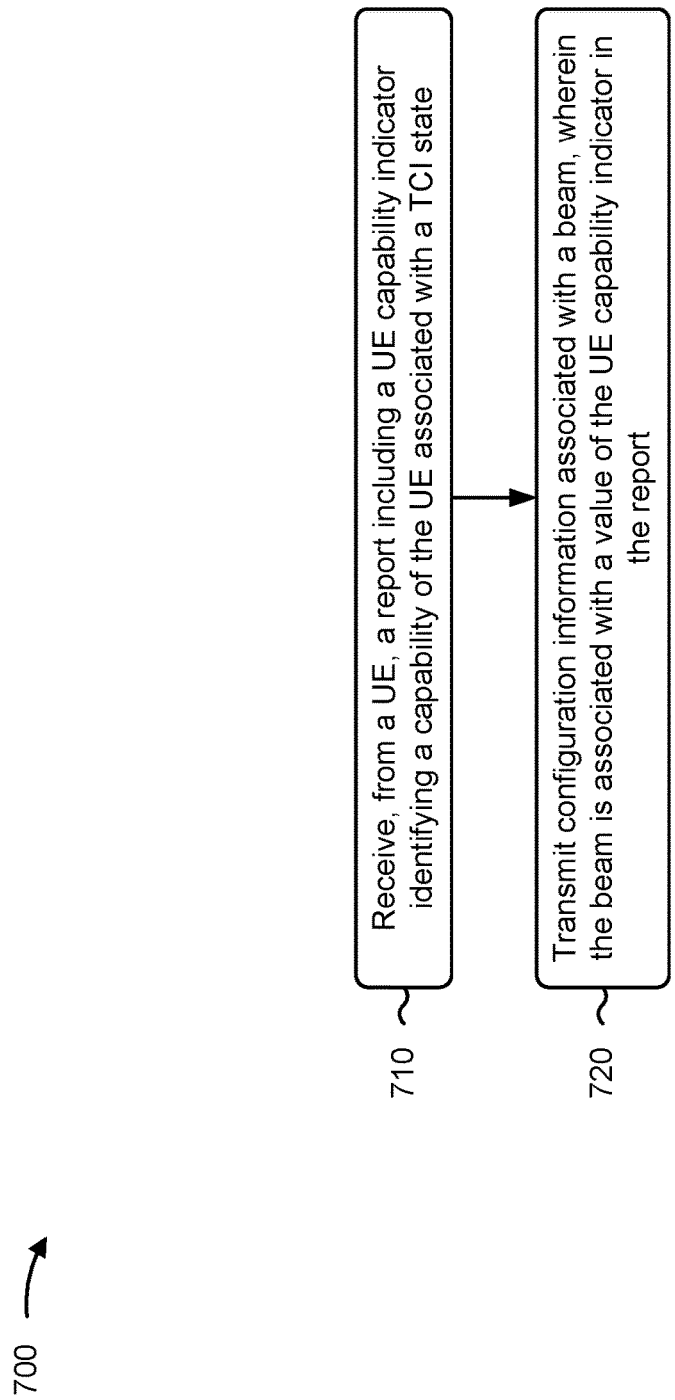

FIG. 7 is a diagram illustrating an example process 700 performed, for example, by a network entity, in accordance with the present disclosure. Example process 700 is an example where the network entity (e.g., the base station 110, the network entity 302, the network entity 402, or the network entity 502, among other examples) performs operations associated with UE capability-based TCI state configuration.

As shown in FIG. 7, in some aspects, process 700 may include receiving, from a UE, a report including a UE capability indicator identifying a capability of the UE associated with a TCI state (block 710). For example, the network entity (e.g., using communication manager 150 and/or reception component 902, depicted in FIG. 9) may receive, from a UE, a report including a UE capability indicator identifying a capability of the UE associated with a TCI state, as described above.

As further shown in FIG. 7, in some aspects, process 700 may include transmitting configuration information associated with a beam, wherein the beam is associated with a value of the UE capability indicator in the report (block 720). For example, the network entity (e.g., using communication manager 150 and/or transmission component 904, depicted in FIG. 9) may transmit configuration information associated with a beam, wherein the beam is associated with a value of the UE capability indicator in the report, as described above.

Process 700 may include additional aspects, such as any single aspect or any combination of aspects described below and/or in connection with one or more other processes described elsewhere herein.

In a first aspect, the configuration information identifies a TCI state mode.

In a second aspect, alone or in combination with the first aspect, the TCI state mode is one of only a first type of beam indication with a first set of parameters, only a second type of beam indication with a second set of parameters, only a third type of beam indication with a third set of parameters, at least one of the first, second, or third type of beam indication for a group of beams, or a first one of the first, second, or third type of beam indication for a first beam of the group of beams and a second one of the first, second, or third type of beam indication for a second beam of the group of beams.

In a third aspect, alone or in combination with one or more of the first and second aspects, the value of the UE capability indicator in the report is associated with a deployment scenario of the UE.

In a fourth aspect, alone or in combination with one or more of the first through third aspects, the UE capability indicator is associated with a communication direction.

In a fifth aspect, alone or in combination with one or more of the first through fourth aspects, the report includes another UE capability indicator associated with another communication direction.

In a sixth aspect, alone or in combination with one or more of the first through fifth aspects, the configuration information identifies a set of TCI state modes, and further comprising transmitting dynamic signaling switching between TCI state modes of the set of TCI state modes.

In a seventh aspect, alone or in combination with one or more of the first through sixth aspects, the UE capability indicator indicates whether the UE supports a configuration relating to a beam misalignment event.

In an eighth aspect, alone or in combination with one or more of the first through seventh aspects, the UE capability indicator indicates that the UE supports the configuration relating to the beam misalignment event, and wherein the configuration information indicates, for the beam, the configuration relating to the beam misalignment event.

In a ninth aspect, alone or in combination with one or more of the first through eighth aspects, the beam misalignment event is associated with a spatial relation reference signal in a TCI state not being a quasi-co-location type-D reference signal of a pathloss reference signal of an indicated quasi-co-location type-D reference signal of the pathloss reference signal.

In a tenth aspect, alone or in combination with one or more of the first through ninth aspects, the beam misalignment event is associated with a spatial relation reference signal in a TCI state not being a pathloss reference signal when there is no indicated quasi-co-location type-D reference signal of the pathloss reference signal.

In an eleventh aspect, alone or in combination with one or more of the first through tenth aspects, the configuration information includes a carrier list for a first TCI state mode multi-carrier beam indication, and the carrier list does not identify any carriers configured with a second TCI state mode.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
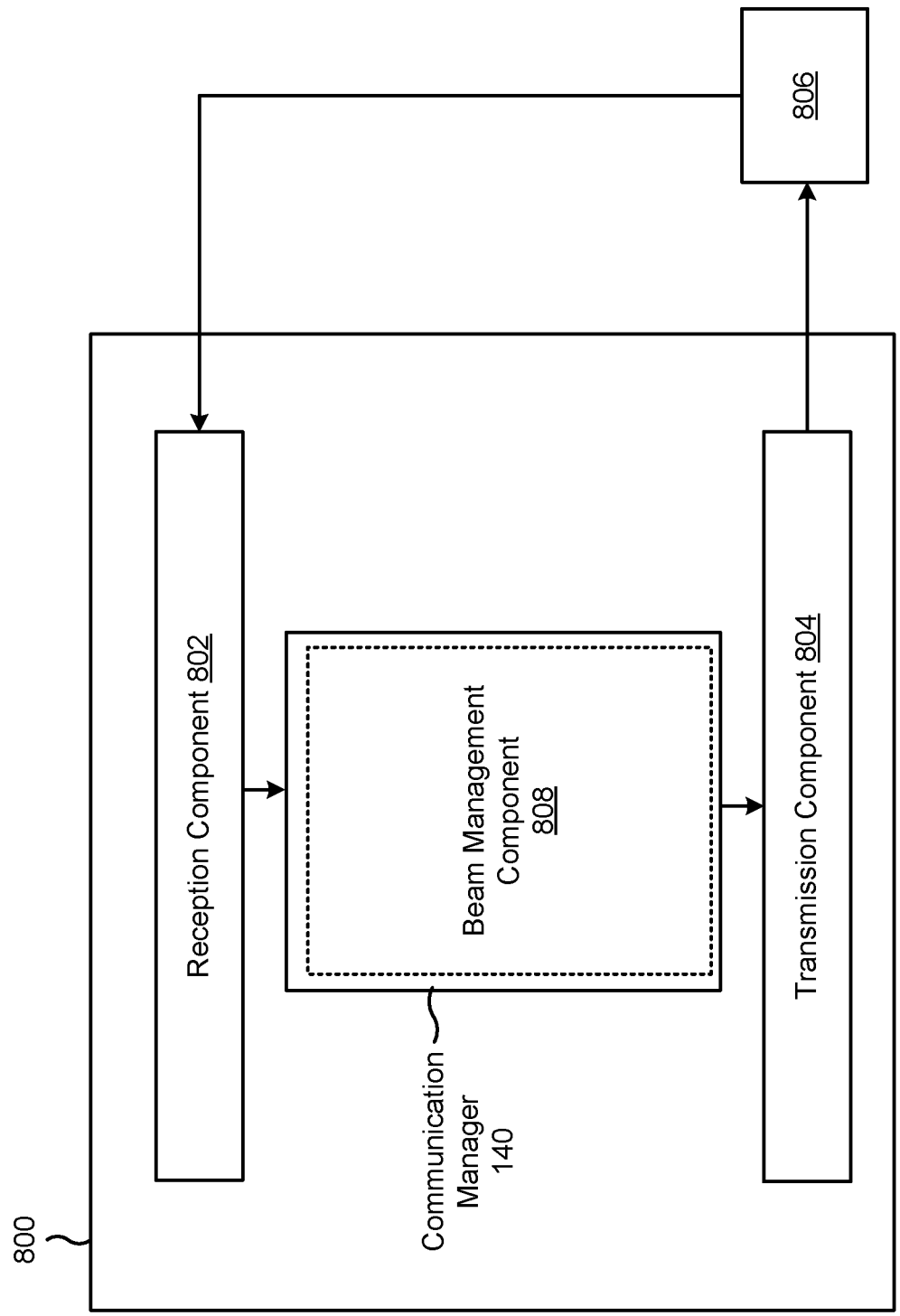
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a beam management component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6 and/or process 1100 of FIG. 11. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The transmission component 804 may transmit a report including a UE capability indicator identifying a capability of the UE associated with a TCI state. The reception component 802 may receive configuration information associated with a beam, wherein the beam is associated with a value of the UE capability indicator in the report. Beam management component 808 may interpret a TCI state in accordance with a selected beam indication version. The reception component 802 may receive configuration information identifying a TCI state mode, wherein the TCI state mode is a first TCI state mode or a second TCI state mode. The reception component 802 and/or the transmission component 804 may communicating using a beam associated with the TCI state mode.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
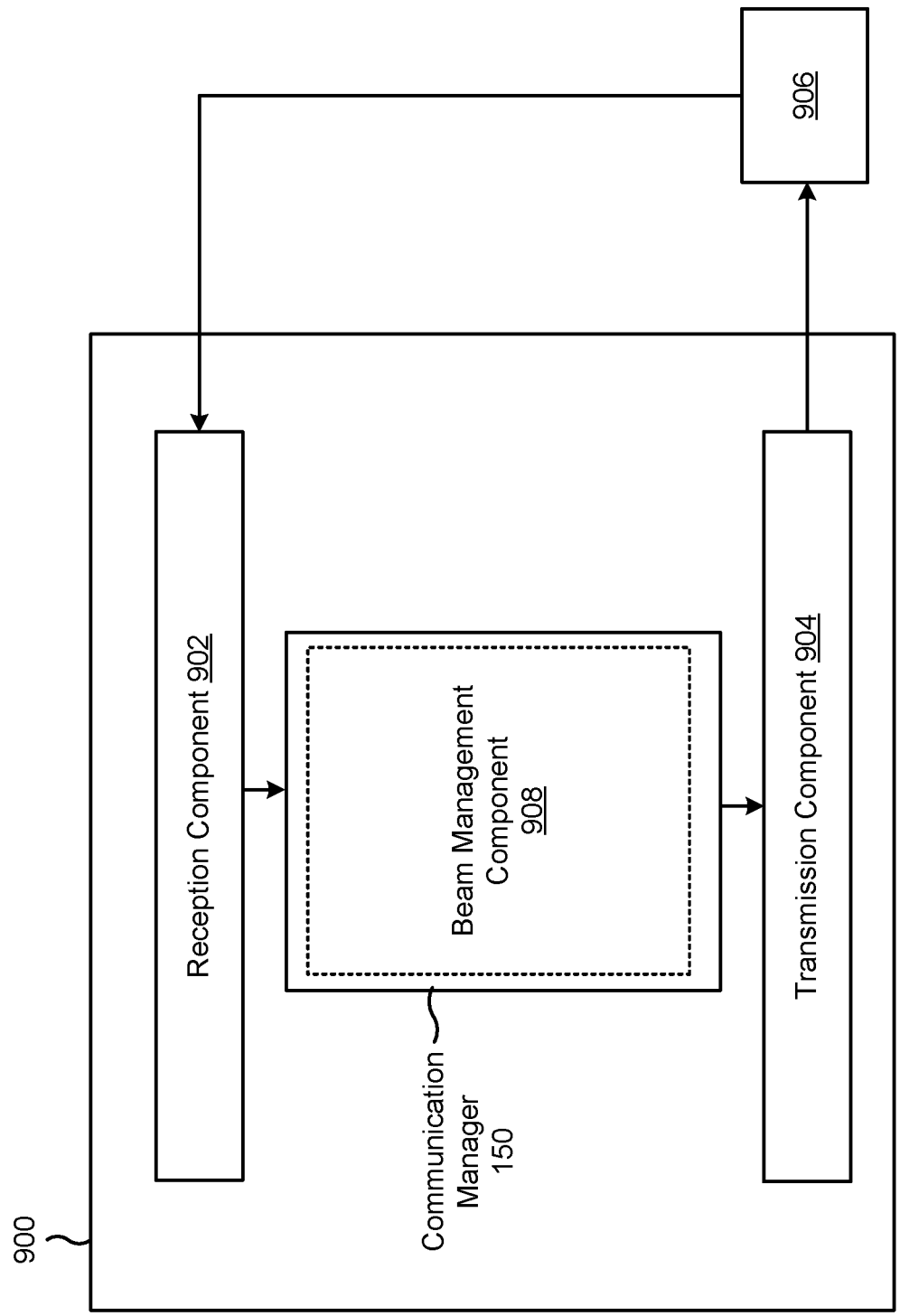

FIG. 9 is a diagram of an example apparatus 900 for wireless communication. The apparatus 900 may be a network entity, or a network entity may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a beam management component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7 or process 1200 of FIG. 12, among other examples. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The reception component 902 may receive, from a UE, a report including a UE capability indicator identifying a capability of the UE associated with a TCI state. The transmission component 904 may transmit configuration information associated with a beam, wherein the beam is associated with a value of the UE capability indicator in the report. The beam management component 908 may determine an indicator of a beam based on a UE capability indicator and cause the indicator to be provided to the apparatus 906 to cause the apparatus 906 to determine the beam according to a configuration of a beam indication version. The transmission component 902 may transmit configuration information identifying a TCI state mode, wherein the TCI state mode is a first TCI state mode or a second TCI state mode. The reception component 902 and/or the transmission component 904 may communicating using a beam associated with the TCI state mode.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
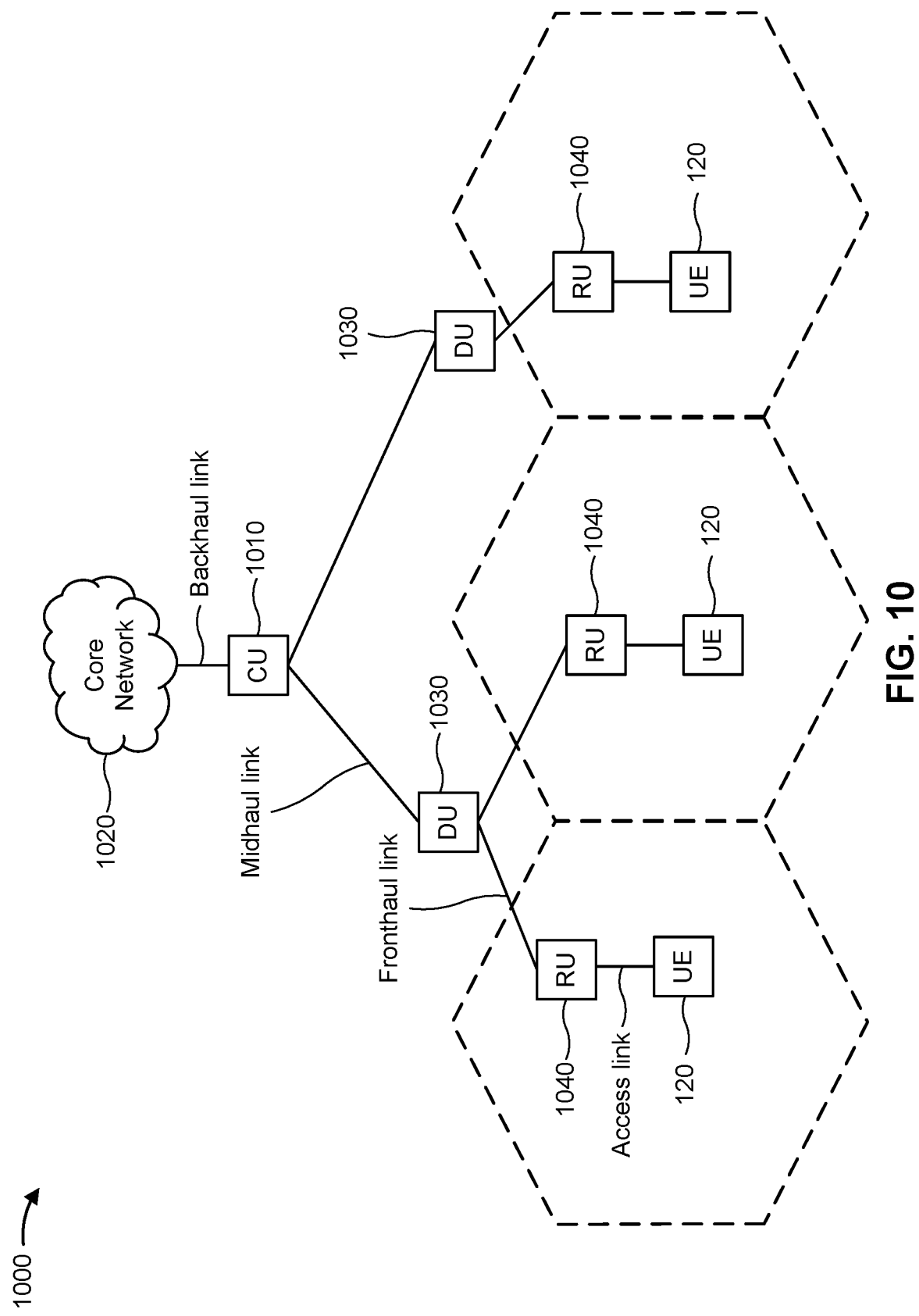
FIG. 10 is a diagram illustrating an example of an open radio access network (O-RAN) architecture, in accordance with the present disclosure.

FIG. 10 is a diagram illustrating an example 1000 of an O-RAN architecture, in accordance with the present disclosure. As shown in FIG. 10, the O-RAN architecture may include a control unit (CU) 1010 that communicates with a core network 1020 via a backhaul link. Furthermore, the CU 1010 may communicate with one or more distributed units (DUs) 1030 via respective midhaul links. The DUs 1030 may each communicate with one or more radio units (RUs) 1040 via respective fronthaul links, and the RUs 1040 may each communicate with respective UEs 120 via radio frequency (RF) access links. The DUs 1030 and the RUs 1040 may also be referred to as O-RAN DUs (O-DUs) 1030 and O-RAN RUs (O-RUs) 1040, respectively.

In some aspects, the DUs 1030 and the RUs 1040 may be implemented according to a functional split architecture in which functionality of a base station 110 (e.g., an eNB or a gNB) is provided by a DU 1030 and one or more RUs 1040 that communicate over a fronthaul link. Accordingly, as described herein, a base station 110 may include a DU 1030 and one or more RUs 1040 that may be co-located or geographically distributed. In some aspects, the DU 1030 and the associated RU(s) 1040 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 1030 may correspond to a logical unit that includes one or more base station functions to control the operation of one or more RUs 1040. For example, in some aspects, the DU 1030 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), RRC, and/or service data adaptation protocol (SDAP), may be hosted by the CU 1010. The RU(s) 1040 controlled by a DU 1030 may correspond to logical nodes that host RF processing functions and low-PHY layer functions (e.g., fast Fourier transform (FFT), inverse FFT (iFFT), digital beamforming, and/or PRACH extraction and filtering) based at least in part on the lower layer functional split. Accordingly, in an O-RAN architecture, the RU(s) 1040 handle all over the air (OTA) communication with a UE 120, and real-time and non-real-time aspects of control and user plane communication with the RU(s) 1040 are controlled by the corresponding DU 1030, which enables the DU(s) 1030 and the CU 1010 to be implemented in a cloud-based RAN architecture.

As indicated above, FIG. 10 is provided as an example. Other examples may differ from what is described with regard to FIG. 10.

Figure 11:
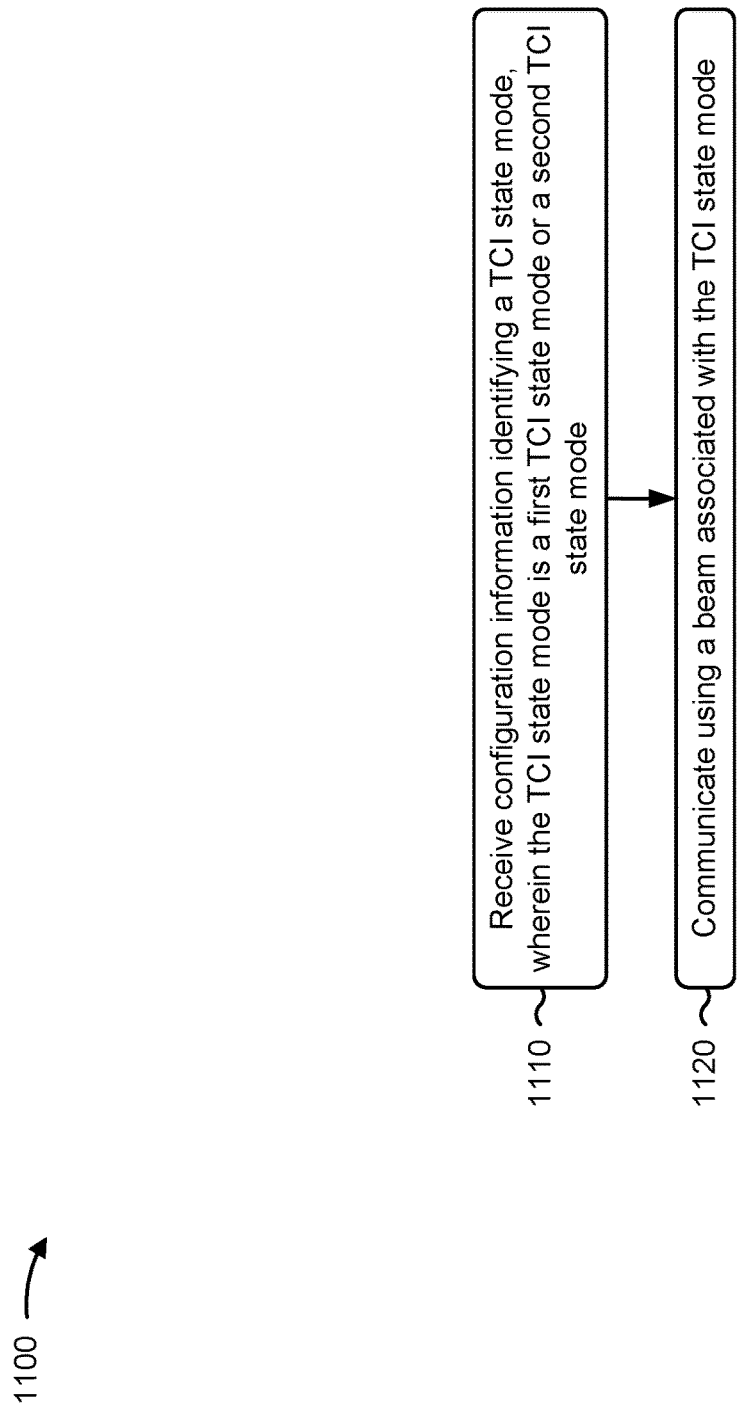
FIGS. 11-12 are diagrams illustrating example processes associated with UE capability-based TCI state configuration, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with UE capability-based TCI state configuration.

As shown in FIG. 11, in some aspects, process 1100 may include receiving configuration information identifying a TCI state mode, wherein the TCI state mode is a first TCI state mode or a second TCI state mode (block 1110). For example, the UE (e.g., using communication manager 140 and/or reception component 802, depicted in FIG. 8) may receive configuration information identifying a TCI state mode, wherein the TCI state mode is a first TCI state mode or a second TCI state mode, as described above.

As further shown in FIG. 11, in some aspects, process 1100 may include communicating using a beam associated with the TCI state mode (block 1120). For example, the UE (e.g., using communication manager 140 and/or reception component 802 and/or transmission component 804, depicted in FIG. 8) may communicate using a beam associated with the TCI state mode, as described above.

Process 1100 may include additional aspects, such as any single aspect or any combination of aspects described below and/or in connection with one or more other processes described elsewhere herein.

In a first aspect, the TCI state mode is unified TCI state or Release 15 (R15) or Release 16 (R16) TCI state.

In a second aspect, alone or in combination with the first aspect, the TCI state mode is configured for a carrier of a band, and wherein another TCI state mode is not configured for any other carrier of the band.

In a third aspect, alone or in combination with one or more of the first and second aspects, the TCI state mode is configured for a carrier of a band, and wherein another TCI state mode is configured for another carrier of another band.

In a fourth aspect, alone or in combination with one or more of the first through third aspects, the TCI state mode is one of only a first type of beam indication with a first set of parameters, only a second type of beam indication with a second set of parameters, only a third type of beam indication with a third set of parameters, at least one of the first, second, or third type of beam indication for a group of beams, or a first one of the first, second, or third type of beam indication for a first beam of the group of beams and a second one of the first, second, or third type of beam indication for a second beam of the group of beams.

In a fifth aspect, alone or in combination with one or more of the first through fourth aspects, process 1100 includes transmitting a report including a UE capability indicator identifying a capability of the UE associated with a transmission configuration indicator (TCI) state, and wherein receiving the configuration information identifying the TCI state mode comprises receiving configuration information associated with a beam, wherein the beam is associated with a value of the UE capability indicator in the report.

In a sixth aspect, alone or in combination with one or more of the first through fifth aspects, the value of the UE capability indicator in the report is associated with a deployment scenario of the UE.

In a seventh aspect, alone or in combination with one or more of the first through sixth aspects, the UE capability indicator is associated with a communication direction.

In an eighth aspect, alone or in combination with one or more of the first through seventh aspects, the report includes another UE capability indicator associated with another communication direction.

In a ninth aspect, alone or in combination with one or more of the first through eighth aspects, the UE capability indicator indicates whether the UE supports a configuration relating to a beam misalignment event.

In a tenth aspect, alone or in combination with one or more of the first through ninth aspects, the beam misalignment event is associated with a spatial relation reference signal in a TCI state not being a quasi-co-location type-D reference signal of a pathloss reference signal of an indicated quasi-co-location type-D reference signal of the pathloss reference signal.

In an eleventh aspect, alone or in combination with one or more of the first through tenth aspects, the beam misalignment event is associated with a spatial relation reference signal in a TCI state not being a pathloss reference signal when there is no indicated quasi-co-location type-D reference signal of the pathloss reference signal.

In a twelfth aspect, alone or in combination with one or more of the first through eleventh aspects, the UE capability indicator indicates that the UE supports the configuration relating to the beam misalignment event, and wherein the configuration information indicates, for the beam, the configuration relating to the beam misalignment event.

In a thirteenth aspect, alone or in combination with one or more of the first through twelfth aspects, the configuration information identifies a set of TCI state modes, and further comprising receiving dynamic signaling switching between TCI state modes of the set of TCI state modes.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
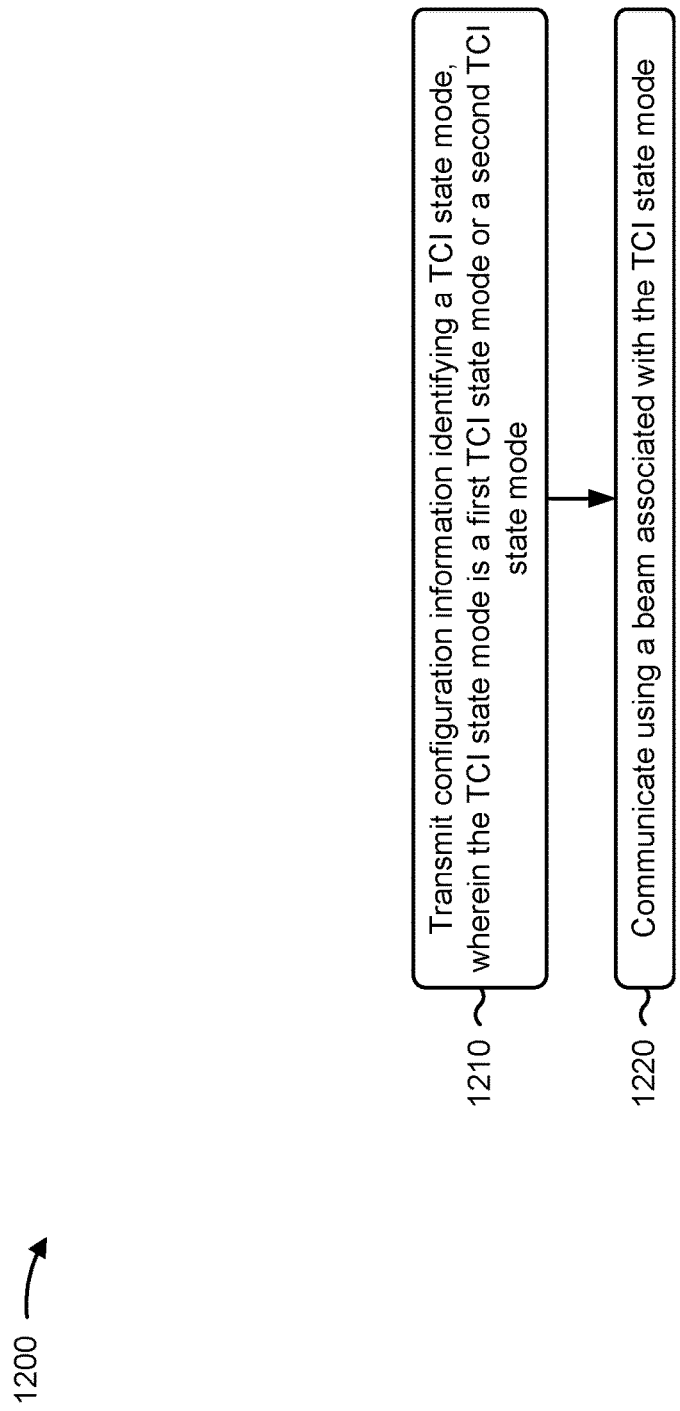

FIG. 12 is a diagram illustrating an example process 1200 performed, for example, by a network entity, in accordance with the present disclosure. Example process 1200 is an example where the network entity (e.g., the base station 110, the network entity 302, the network entity 402, or the network entity 502, among other examples) performs operations associated with UE capability-based TCI state configuration.

As shown in FIG. 12, in some aspects, process 1200 may include transmitting configuration information identifying a TCI state mode, wherein the TCI state mode is a first TCI state mode or a second TCI state mode (block 1210). For example, the network entity (e.g., using communication manager 150 and/or transmission component 904, depicted in FIG. 9) may transmit configuration information identifying a TCI state mode, wherein the TCI state mode is a first TCI state mode or a second TCI state mode, as described above.

As further shown in FIG. 12, in some aspects, process 1200 may include communicating using a beam associated with the TCI state mode (block 1220). For example, the network entity (e.g., using communication manager 150 and/or reception component 902 and/or transmission component 904, depicted in FIG. 9) may communicate using a beam associated with the TCI state mode, as described above.

Process 1200 may include additional aspects, such as any single aspect or any combination of aspects described below and/or in connection with one or more other processes described elsewhere herein.

In a first aspect, the TCI state mode is unified TCI state or Release 15 (R15) or Release 16 (R16) TCI state.

In a second aspect, alone or in combination with the first aspect, the TCI state mode is configured for a carrier of a band, and wherein another TCI state mode is not configured for any other carrier of the band.

In a third aspect, alone or in combination with one or more of the first and second aspects, the TCI state mode is configured for a carrier of a band, and wherein another TCI state mode is configured for another carrier of another band.

In a fourth aspect, alone or in combination with one or more of the first through third aspects, the TCI state mode is one of only a first type of beam indication with a first set of parameters, only a second type of beam indication with a second set of parameters, only a third type of beam indication with a third set of parameters, at least one of the first, second, or third type of beam indication for a group of beams, or a first one of the first, second, or third type of beam indication for a first beam of the group of beams and a second one of the first, second, or third type of beam indication for a second beam of the group of beams.

In a fifth aspect, alone or in combination with one or more of the first through fourth aspects, process 1200 includes receiving a report including a UE capability indicator identifying a capability of the UE associated with a TCI state, and wherein transmitting the configuration information identifying the TCI state mode comprises transmitting configuration information associated with a beam, wherein the beam is associated with a value of the UE capability indicator in the report.

In a sixth aspect, alone or in combination with one or more of the first through fifth aspects, the value of the UE capability indicator in the report is associated with a deployment scenario of the UE.

In a seventh aspect, alone or in combination with one or more of the first through sixth aspects, the UE capability indicator is associated with a communication direction.

In an eighth aspect, alone or in combination with one or more of the first through seventh aspects, the report includes another UE capability indicator associated with another communication direction.

In a ninth aspect, alone or in combination with one or more of the first through eighth aspects, the UE capability indicator indicates whether the UE supports a configuration relating to a beam misalignment event.

In a tenth aspect, alone or in combination with one or more of the first through ninth aspects, the beam misalignment event is associated with a spatial relation reference signal in a TCI state not being a quasi-co-location type-D reference signal of a pathloss reference signal of an indicated quasi-co-location type-D reference signal of the pathloss reference signal.

In an eleventh aspect, alone or in combination with one or more of the first through tenth aspects, the beam misalignment event is associated with a spatial relation reference signal in a TCI state not being a pathloss reference signal when there is no indicated quasi-co-location type-D reference signal of the pathloss reference signal.

In a twelfth aspect, alone or in combination with one or more of the first through eleventh aspects, the UE capability indicator indicates that the UE supports the configuration relating to the beam misalignment event, and wherein the configuration information indicates, for the beam, the configuration relating to the beam misalignment event.

In a thirteenth aspect, alone or in combination with one or more of the first through twelfth aspects, the configuration information identifies a set of TCI state modes, and further comprising transmitting dynamic signaling switching between TCI state modes of the set of TCI state modes.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The following provides an overview of some Aspects of the present disclosure:

Aspect 1: A method of wireless communication performed by a user equipment (UE), comprising: receiving configuration information identifying a transmission configuration indicator (TCI) state mode, wherein the TCI state mode is a first TCI state mode or a second TCI state mode; and communicating using a beam associated with the TCI state mode.

Aspect 2: The method of Aspect 1, wherein the TCI state mode is unified TCI state or Release 15 (R15) or Release 16 (R16) TCI state.

Aspect 3: The method of any of Aspects 1 to 2, wherein the TCI state mode is configured for a carrier of a band, and wherein another TCI state mode is not configured for any other carrier of the band.

Aspect 4: The method of any of Aspects 1 to 2, wherein the TCI state mode is configured for a carrier of a band, and wherein another TCI state mode is configured for another carrier of another band.

Aspect 5: The method of any of Aspects 1 to 3, wherein the TCI state mode is one of: only a first type of beam indication with a first set of parameters, only a second type of beam indication with a second set of parameters, only a third type of beam indication with a third set of parameters, at least one of the first, second, or third type of beam indication for a group of beams, or a first one of the first, second, or third type of beam indication for a first beam of the group of beams and a second one of the first, second, or third type of beam indication for a second beam of the group of beams.

Aspect 6: The method of any of Aspects 1 to 4, comprising: transmitting a report including a UE capability indicator identifying a capability of the UE associated with a transmission configuration indicator (TCI) state; and wherein receiving the configuration information identifying the TCI state mode comprises: receiving configuration information associated with a beam, wherein the beam is associated with a value of the UE capability indicator in the report.

Aspect 7: The method of Aspect 6, wherein the value of the UE capability indicator in the report is associated with a deployment scenario of the UE.

Aspect 8: The method of any of Aspects 6 to 7, wherein the UE capability indicator is associated with a communication direction.

Aspect 9: The method of Aspect 8, wherein the report includes another UE capability indicator associated with another communication direction.

Aspect 10: The method of any of Aspects 6 to 9, wherein the UE capability indicator indicates whether the UE supports a configuration relating to a beam misalignment event.

Aspect 11: The method of Aspect 10, wherein the beam misalignment event is associated with a spatial relation reference signal in a TCI state not being a quasi-co-location type-D reference signal of a pathloss reference signal of an indicated quasi-co-location type-D reference signal of the pathloss reference signal.

Aspect 12: The method of any of Aspects 10 to 11, wherein the beam misalignment event is associated with a spatial relation reference signal in a TCI state not being a pathloss reference signal when there is no indicated quasi-co-location type-D reference signal of the pathloss reference signal.

Aspect 13: The method of any of Aspects 10 to 12, wherein the UE capability indicator indicates that the UE supports the configuration relating to the beam misalignment event, and wherein the configuration information indicates, for the beam, the configuration relating to the beam misalignment event.

Aspect 14: The method of any of Aspects 1 to 13, wherein the configuration information identifies a set of TCI state modes, and further comprising: receiving dynamic signaling switching between TCI state modes of the set of TCI state modes.

Aspect 15: A method of wireless communication performed by a network entity, comprising: transmitting configuration information identifying a transmission configuration indicator (TCI) state mode, wherein the TCI state mode is a first TCI state mode or a second TCI state mode; and communicating using a beam associated with the TCI state mode.

Aspect 16: The method of Aspect 15, wherein the TCI state mode is unified TCI state or Release 15 (R15) or Release 16 (R16) TCI state.

Aspect 17: The method of any of Aspects 15 to 16, wherein the TCI state mode is configured for a carrier of a band, and wherein another TCI state mode is not configured for any other carrier of the band.

Aspect 18: The method of any of Aspects 15 to 16, wherein the TCI state mode is configured for a carrier of a band, and wherein another TCI state mode is configured for another carrier of another band.

Aspect 19: The method of any of Aspects 15 to 18, wherein the TCI state mode is one of: only a first type of beam indication with a first set of parameters, only a second type of beam indication with a second set of parameters, only a third type of beam indication with a third set of parameters, at least one of the first, second, or third type of beam indication for a group of beams, or a first one of the first, second, or third type of beam indication for a first beam of the group of beams and a second one of the first, second, or third type of beam indication for a second beam of the group of beams.

Aspect 20: The method of any of Aspects 15 to 19, comprising: receiving a report including a UE capability indicator identifying a capability of the UE associated with a transmission configuration indicator (TCI) state; and wherein transmitting the configuration information identifying the TCI state mode comprises: transmitting configuration information associated with a beam, wherein the beam is associated with a value of the UE capability indicator in the report.

Aspect 21: The method of Aspect 20, wherein the value of the UE capability indicator in the report is associated with a deployment scenario of the UE.

Aspect 22: The method of any of Aspects 20 to 21, wherein the UE capability indicator is associated with a communication direction.

Aspect 23: The method of Aspect 22, wherein the report includes another UE capability indicator associated with another communication direction.

Aspect 24: The method of any of Aspects 20 to 23, wherein the UE capability indicator indicates whether the UE supports a configuration relating to a beam misalignment event.

Aspect 25: The method of Aspect 24, wherein the beam misalignment event is associated with a spatial relation reference signal in a TCI state not being a quasi-co-location type-D reference signal of a pathloss reference signal of an indicated quasi-co-location type-D reference signal of the pathloss reference signal.

Aspect 26: The method of any of Aspects 24 to 25, wherein the beam misalignment event is associated with a spatial relation reference signal in a TCI state not being a pathloss reference signal when there is no indicated quasi-co-location type-D reference signal of the pathloss reference signal.

Aspect 27: The method of any of Aspects 24 to 26, wherein the UE capability indicator indicates that the UE supports the configuration relating to the beam misalignment event, and wherein the configuration information indicates, for the beam, the configuration relating to the beam misalignment event.

Aspect 28: The method of any of Aspects 15 to 27, wherein the configuration information identifies a set of TCI state modes, and further comprising: receiving dynamic signaling switching between TCI state modes of the set of TCI state modes.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories comprising processor-executable instructions; and
one or more processors configured to execute the processor-executable instructions and cause the UE to:
receive configuration information identifying a transmission configuration indicator (TCI) state mode, wherein the TCI state mode is a first TCI state mode or a second TCI state mode, wherein the TCI state mode is configured for a carrier of a band, and wherein no other TCI state mode is configured for any of the other carriers of the band; and
communicate using a beam associated with the TCI state mode.

2. The UE of claim 1, wherein the TCI state mode is unified TCI state or Release 15 (R15) or Release 16 (R16) TCI state.

3. The UE of claim 1, wherein the TCI state mode is configured for a carrier of a band, and
wherein a third TCI state mode is configured for another carrier of another band.

4. The UE of claim 1, wherein the TCI state mode is one of:
only a first type of beam indication with a first set of parameters,
only a second type of beam indication with a second set of parameters,
only a third type of beam indication with a third set of parameters,
at least one of the first, second, or third type of beam indication for a group of beams, or
a first one of the first, second, or third type of beam indication for a first beam of the group of beams and a second one of the first, second, or third type of beam indication for a second beam of the group of beams.

5. The UE of claim 1, wherein the one or more processors are configured to cause the UE to:
transmit a report including a UE capability indicator identifying a capability of the UE associated with a transmission configuration indicator (TCI) state; and
wherein the one or more processors, that cause the UE to receive the configuration information identifying the TCI state mode, are configured to cause the UE to:
receive configuration information associated with a beam, wherein the beam is associated with a value of the UE capability indicator in the report.

6. The UE of claim 5, wherein the value of the UE capability indicator in the report is associated with a deployment scenario of the UE.

7. The UE of claim 5, wherein the UE capability indicator is associated with a communication direction.

8. The UE of claim 7, wherein the report includes another UE capability indicator associated with another communication direction.

9. The UE of claim 5, wherein the UE capability indicator indicates whether the UE supports a configuration relating to a beam misalignment event.

10. The UE of claim 9, wherein the beam misalignment event is associated with a spatial relation reference signal in a TCI state not being a quasi-co-location type-D reference signal of a pathloss reference signal of an indicated quasi-co-location type-D reference signal of the pathloss reference signal.

11. The UE of claim 9, wherein the beam misalignment event is associated with a spatial relation reference signal in a TCI state not being a pathloss reference signal when there is no indicated quasi-co-location type-D reference signal of the pathloss reference signal.

12. The UE of claim 9, wherein the UE capability indicator indicates that the UE supports the configuration relating to the beam misalignment event, and
wherein the configuration information indicates, for the beam, the configuration relating to the beam misalignment event.

13. The UE of claim 1, wherein the configuration information identifies a set of TCI state modes, and
wherein the one or more processors are further configured to cause the UE to:
receive dynamic signaling switching between TCI state modes of the set of TCI state modes.

14. A network entity for wireless communication, comprising:
one or more memories comprising processor-executable instructions; and
one or more processors configured to execute the processor-executable instructions and cause the network entity to:
transmit configuration information identifying a transmission configuration indicator (TCI) state mode, wherein the TCI state mode is a first TCI state mode or a second TCI state mode, wherein the TCI state mode is configured for a carrier of a band, and wherein no other TCI state mode is configured for any of the other carriers of the band; and
communicate using a beam associated with the TCI state mode.

15. The network entity of claim 14, wherein the TCI state mode is unified TCI state or Release 15 (R15) or Release 16 (R16) TCI state.

16. The network entity of claim 14, wherein the TCI state mode is configured for a carrier of a band, and
wherein a third TCI state mode is configured for another carrier of another band.

17. The network entity of claim 14, wherein the TCI state mode is one of:
only a first type of beam indication with a first set of parameters,
only a second type of beam indication with a second set of parameters,
only a third type of beam indication with a third set of parameters,
at least one of the first, second, or third type of beam indication for a group of beams, or
a first one of the first, second, or third type of beam indication for a first beam of the group of beams and a second one of the first, second, or third type of beam indication for a second beam of the group of beams.

18. The network entity of claim 14, comprising:
receive a report including a UE capability indicator identifying a capability of the UE associated with a transmission configuration indicator (TCI) state; and
wherein the one or more processors, to transmit the configuration information identifying the TCI state mode, are configured to:
transmit configuration information associated with a beam, wherein the beam is associated with a value of the UE capability indicator in the report.

19. The network entity of claim 18, wherein the value of the UE capability indicator in the report is associated with a deployment scenario of the UE.

20. The network entity of claim 18, wherein the UE capability indicator is associated with a communication direction.

21. The network entity of claim 20, wherein the report includes another UE capability indicator associated with another communication direction.

22. The network entity of claim 18, wherein the UE capability indicator indicates whether the UE supports a configuration relating to a beam misalignment event.

23. The network entity of claim 22, wherein the beam misalignment event is associated with a spatial relation reference signal in a TCI state not being a quasi-co-location type-D reference signal of a pathloss reference signal of an indicated quasi-co-location type-D reference signal of the pathloss reference signal.

24. The network entity of claim 22, wherein the beam misalignment event is associated with a spatial relation reference signal in a TCI state not being a pathloss reference signal when there is no indicated quasi-co-location type-D reference signal of the pathloss reference signal.

25. The network entity of claim 22, wherein the UE capability indicator indicates that the UE supports the configuration relating to the beam misalignment event, and
wherein the configuration information indicates, for the beam, the configuration relating to the beam misalignment event.

26. The network entity of claim 18, wherein the configuration information identifies a set of TCI state modes, and
wherein the one or more processors are further configured to:
transmit dynamic signaling switching between TCI state modes of the set of TCI state modes.

27. A method of wireless communication performed by a user equipment (UE), comprising:
receiving configuration information identifying a transmission configuration indicator (TCI) state mode, wherein the TCI state mode is a first TCI state mode or a second TCI state mode, wherein the TCI state mode is configured for a carrier of a band, and wherein no other TCI state mode is configured for any of the other carriers of the band; and
communicating using a beam associated with the TCI state mode.

28. A method of wireless communication performed by a network entity, comprising:
transmitting configuration information identifying a transmission configuration indicator (TCI) state mode, wherein the TCI state mode is a first TCI state mode or a second TCI state mode, wherein the TCI state mode is configured for a carrier of a band, and wherein no other TCI state mode is configured for any of the other carriers of the band; and
communicating using a beam associated with the TCI state mode.

* * * * *